United States Patent [19]

Becker

[11] Patent Number: 5,247,769
[45] Date of Patent: Sep. 28, 1993

[54] FLEXIBLE EDGE MOLDING FOR CURVED SURFACES

[76] Inventor: Kenneth G. Becker, 1351 Brandywine La., St. Peters, Mo. 63376

[21] Appl. No.: 978,793

[22] Filed: Nov. 19, 1992

[51] Int. Cl.⁵ .............................................. E04B 9/00
[52] U.S. Cl. ....................................... 52/484; 52/716.8
[58] Field of Search ................. 52/488, 484, 716.1, 52/717.04, 717.01; 49/46.2

[56] References Cited
U.S. PATENT DOCUMENTS
3,038,572 6/1962 Becker .
3,159,251 12/1964 Becker .
4,188,424 2/1980 Ohno et al. .................. 52/716.1 X
4,769,966 9/1988 Petri ............................... 49/462 X Primary Examiner—Philip C. Kannan
Attorney, Agent, or Firm—Grace J. Fishel

[57] ABSTRACT

A flexible edge molding having a web for attachment to a curved wall and a support flange attached at the lower margin of the web and extending outwardly from the curved wall for use in supporting acoustical ceiling panels or metal pans. A row of narrow V-shaped notches opening outwardly are formed in the support flange. A stretchable tape is stretched over the notches. The base of the notches is at or adjacent a bending radius connecting the web and the support flange.

5 Claims, 2 Drawing Sheets

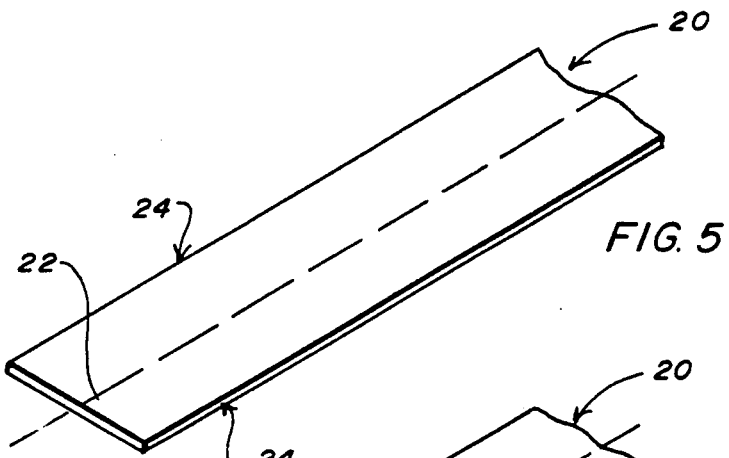
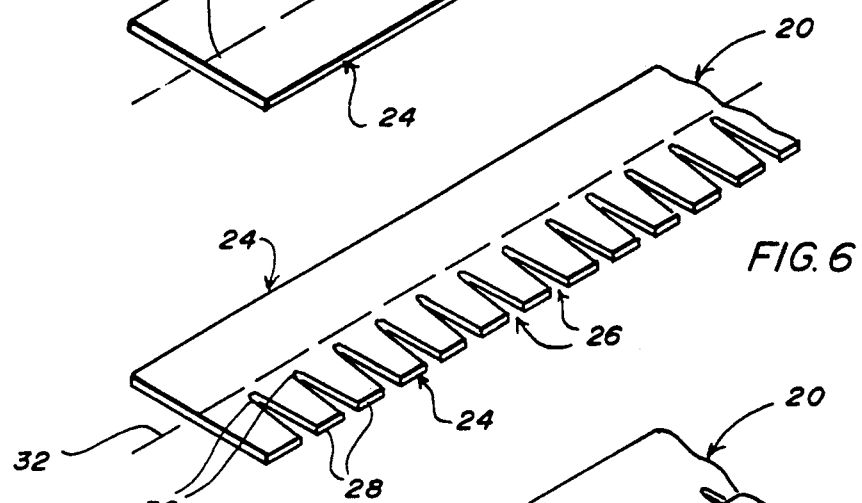
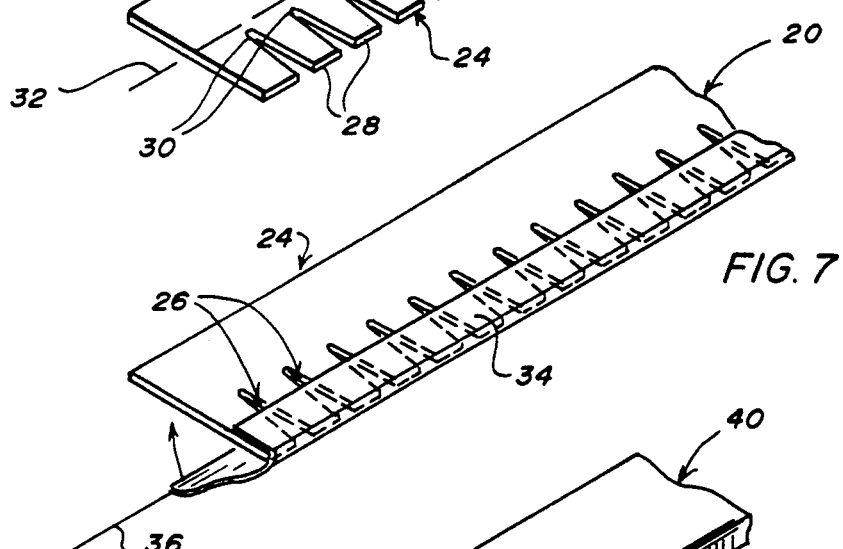
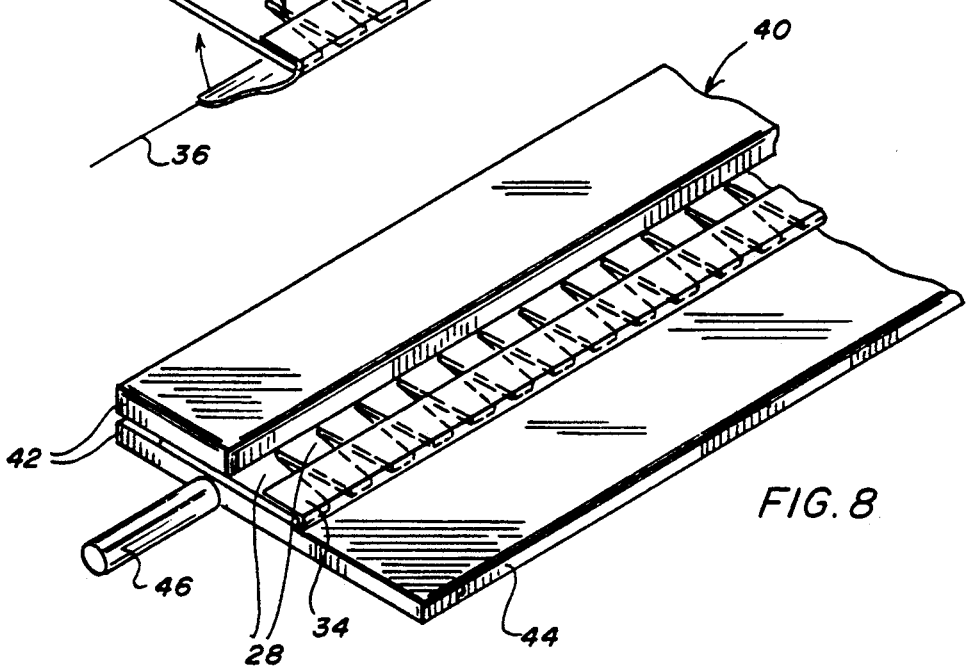

FLEXIBLE EDGE MOLDING FOR CURVED SURFACES

The present invention relates to a flexible edge molding for use in installing a suspended ceiling around a curved surface.

BACKGROUND OF THE INVENTION

Suspended ceilings, also known as dropped ceilings, are often used to lower and modernize an existing ceiling, to cover a damaged ceiling or to hide exposed plumbing, wiring and joints. A metal network consisting of main runners, cross-pieces and L- or U-shaped edge molding is installed. Acoustical ceiling panels or metal pans are then inserted between the grids formed by the runners, cross-pieces and edge molding.

Sometimes a suspended ceiling is installed around a column or along a curved wall. Such an installation requires that the edge molding follow the curvature of the column or the wall. When the wall is serpentine (i.e., with compound curves), the installation can be quite complex.

It is not feasible to provide custom made curved edge molding because of the variety of shapes required and because curved walls and columns even built on the same plan vary to some extent. Ordinary edge molding can be notched with a hacksaw or sheet metal hand shear at intervals corresponding to the degree of curvature needed and then bent. This is a time consuming process and leaves an extremely unsightly installation as there are gaps between the individual notches as they open to accommodate the curvature of an outside curve. Around an inside curve, the tabs of metal between the notches are forced to interleaf and the molding tends to wrinkle.

The present invention relates to an improvement over the flexible edge molding described in U.S. Pat. No. 3,159,252 to Becker. The molding shown and described in the Becker patent is L- or U-shaped. The flanges of L- or U-shaped edge molding have wide square cut notches. Commercially available edge molding is formed from a flat strip of steel. The strip is notched along the sides to become flanges and a piece of plastic tape is wrapped around that edge to become the bottom flange. The molding is then placed in a bending brake having a press and a pivoted leaf. That side of the strip to become a web is held in the press while the leaf supports that part of the strip to become a flange. The base of the notch is about ⅛ inch from the middle of the bending radius. As the leaf pivots, deflection in the flange varies across the notched edge. The tabs between the notches are bent at a sharper angle than is the flange at the base of the notches. (Deflection in general is equal to $Pl^3/mEI$ where P is force, l is the height of flange in the tab or base, m is the coefficient of deflection, E is the modulus of elasticity and I is the moment of inertia). In consequence, the base of the notch is bent at less than 90 degrees and shows as a relief in the tape.

If the notch is spaced more than ⅛ inch from the bend, the notch shows less in the tape but the flexible molding cannot be bent around as tight a curve. Commercially available flexible molding with the base of notch ⅛ of an inch from the bend can be bent to an outside radius of about 18 inches and an inside radius of about 36 inches. If the outside radius is much less than 18 inches, the flanges tend to lay out (i.e. the included angle between the flange and the web is made obtuse). When the molding lays out, the ceiling panels or pans do not lay flat on the flange and there is gap along the edge of the wall. On the other hand, if the flexible molding is used on a curve with an inside radius less than about 36 inches, the flange wrinkles between the tabs.

SUMMARY OF THE INVENTION

An important object of the present invention is to provide a flexible edge molding of improved quality that can be used around a tighter inside or outside curve. Another object is to provide a flexible edge molding that does not lay out or image the notches in the tape. Other objects and features of the invention will be in part apparent and in part point out hereinafter.

In accordance with the invention, a flexible edge molding has a web for attachment along a curved wall and a support flange attached at the lower margin of the web. The support flange extends outwardly from the curved wall for use in supporting acoustical ceiling panels or metal pans.

To make the flexible edge molding, a metal strip is selected having a longitudinal axis and a pair of side edges parallel thereto. A row of narrow spaced apart generally V-shaped notches are formed along one of the side edges of the strip. Each of the notches has a base and the bases preferably form a line parallel with the side edges of the strip.

A thin stretchable plastic tape with a longitudinal axis is selected and longitudinally stretched as it is attached along the notched side edge of the metal strip to cover and conceal the notches. The support flange and web are then formed when a right angle bend is made in the metal strip along a line adjacent to the base of the V-shaped notches.

The invention summarized above comprises the constructions hereinafter described, the scope of the invention being indicated by the subjoined claimed.

BRIEF DESCRIPTION OF THE DRAWINGS

In the accompanying drawings, in which two of various possible embodiments of the invention is illustrated, corresponding reference characters refer to corresponding parts throughout the several views of the drawings in which:

FIGS. 5-8 show a process for forming the flexible molding shown in FIG. 1 wherein:

FIG. 5 shows a metal strip;

FIG. 6 shows the metal strip after it has been notched along one side edge;

FIG. 7 shows the metal strip as the notches are being covered with a stretchable plastic tape; and, FIG. 8 shows the metal strip just prior to being bent.

DETAILED DESCRIPTION OF THE INVENTION

Figures 1, 2:
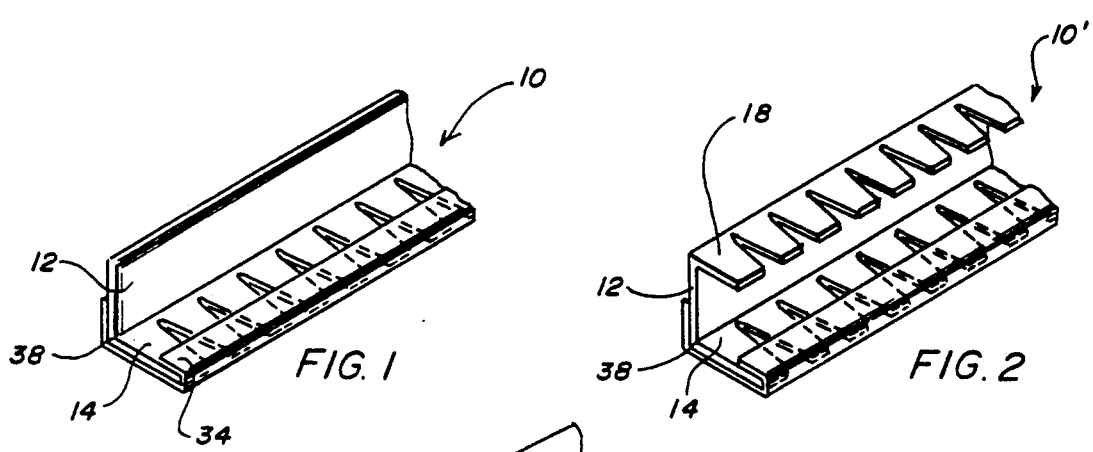
FIG. 1 is a perspective view of a first flexible edge molding in accordance with the present invention.
FIG. 2 is a perspective view of a second flexible edge molding in accordance with the present invention.
Figure 4:
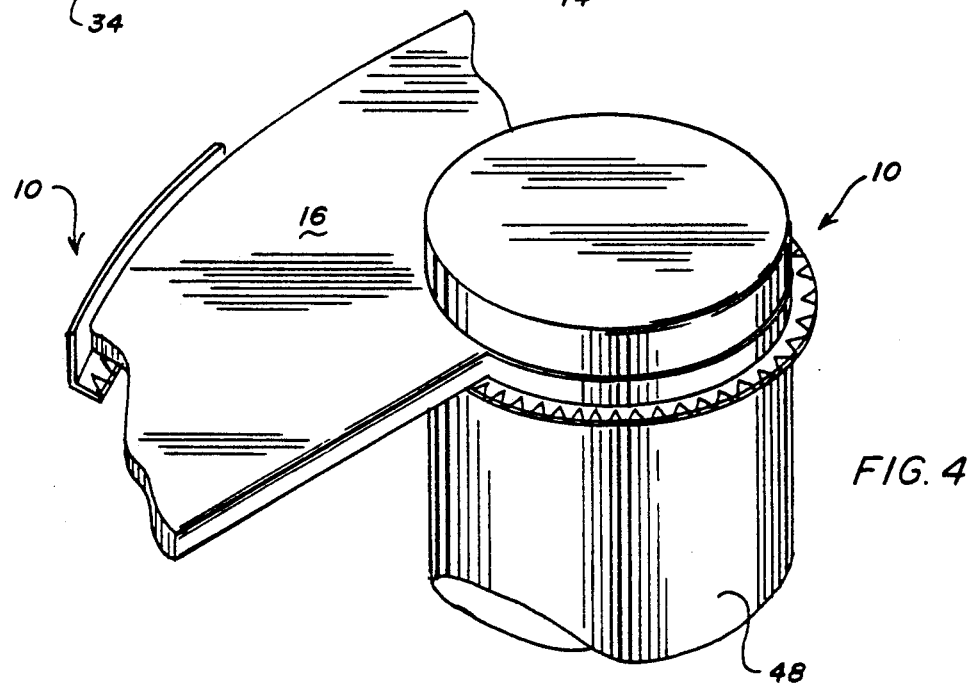
FIG. 4 is a perspective view of the edge molding shown in FIG. 1 in use supporting a ceiling panel around an inside and an outside curve.

Referring to the drawings more particularly by reference character, as shown in FIG. 1 reference numeral 10 refers to a flexible edge molding in accordance with the present invention. Edge molding 10 has a web 12 for attachment along a curved wall and a support flange 14 attached at the lower margin of the web. When web 12 is attached to a curved wall as more particularly described below, support flange 14 extends outwardly from the curved wall for use in supporting an acoustical ceiling panel 16 or metal pan as illustrated in FIG. 4.

For some ceiling systems, edge molding 10' as shown in FIG. 2 has a second flange 18 attached at the upper margin of web 12. In these systems, clips (not shown) are wedged between ceiling panel 16 and second flange 18 to secure the ceiling panel in place. Other clips (not shown) may be used to compress the panels laterally against web 12.

Referring now to FIG. 5, edge molding 10 is formed from a metal strip 20 having a longitudinal axis 22 with a pair of side edges 24 parallel thereto. Metal strip 20 is bendable and preferably made from 26 gauge steel. Strip 20 may be about 3 inches to 6 inches wide, for example, depending on the application.

Figure 3:
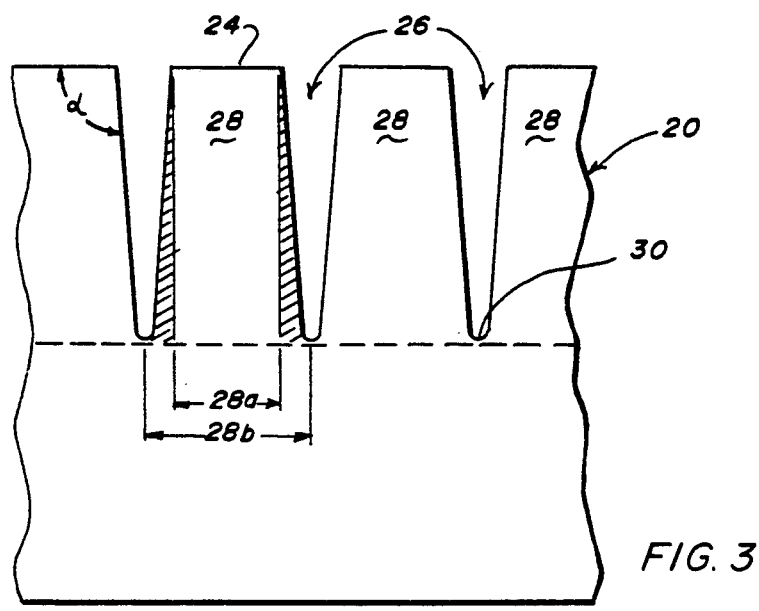
FIG. 3 is a plan view of a metal strip on an enlarged scale after it has been notched as shown in FIG. 6.

As shown in FIG. 6, a row of regularly spaced, narrow generally V-shaped notches 26 are formed along one of side edges 24. This operation can be performed with a punch and die, leaving truncated tapered tabs 28 between notches 26. Each of notches 26 terminates in a base 30 and the bases preferably form a line 32 parallel with side edges 24. A preferred embodiment of the invention is illustrated in FIG. 3. Base 30 has a curvature of 0.030 radians and tabs 28 are 0.875 inch high, 0.360 inch wide at the top (28a) and 0.540 inch wide at the bottom (28b).

Edge molding 10' is made from a metal strip 20 like edge molding 10 except that the strip is usually wider and V-shaped notches 26 are formed along both of side edges 24.

With reference to FIG. 7, a thin stretchable plastic tape 34 with a longitudinal axis 36 and preferably with a self-adhesive backing is selected. Tape 34 is relatively thin and is made of a material that is resilient and stretchable, such as vinyl or some other natural or synthetic plastic materials with similar characteristics A non-limiting but effective adhesive tape having an overall thickness of 0.006 inch is formed from a 0.0045 inch thick vinyl film with a 0.0015 inch thick adhesive layer. The plastic may be of a color which corresponds or blends with the color of the acoustical panels or pans, such as white, aluminum, etc. and is preferably opaque so as to render the notches invisible.

Tape 34 is longitudinally stretched as it is attached along notched side edge 24 to cover and conceal the notches. Since tape 34 is stretchable, it stretches across notches 26 as they angle open when the flexible edge molding is bent around an outside curve such as column. And since tape 34 is stretched as it is attached, it closes across notches 26 as they angle closed when the flexible edge molding is bent around an inside curve.

As compared to square-notched commercially available flexible molding, tape 34 is stretched more evenly across notches 26 in flexible molding 10 and 10' for improved film return on inside curves. There is also a more linear stretch on outside curves. As shown in FIG. 3, the angle α between side edge 24 and notches 26 is less than 90 degrees so that tape 34 is less likely to be torn when the notches are opened out. In addition tabs 28 are sturdier such that the molding is less likely to be damaged during installation or in use. Tabs 28 also make proportionately more contact with tape 34 (see shaded area in FIG. 3).

Preferably, as shown in FIGS. 1 and 2, tape 34 is adhered to strip 20 from a point on the upper inside of support flange 14, around the flange and part way up web 12. This forms a wrap which not only covers notches 26 on their exposed sides but also covers the edge of the flange.

Continuing to FIG. 8, a right angle bend 38 is made in metal strip 20 with a bending brake 40. Brake 40 has a pair of opposing jaws 42 and a leaf 44 which can be pivoted along a bending axis 46. Strip 20 is positioned in bending brake 40 such that the notched side edge overlies the leaf and the opposite side edge is held between jaws 42. Line 32 through bases 30 is positioned at or closely adjacent to axis 46 (e.g., within 1/16 inch or closer). As leaf 44 is pivoted about axis 46, the notched side edge forms support flange 14 and the side edge between jaws 42 becomes web 12. (It will be apparent that strip 20 must be processed twice in bending brake 40 to form U-shaped flexible molding 10'.)

In use, flexible molding 10 or 10' is attached to a curved wall 48 along web 12 as shown in FIG. 4. Since base 30 of notches 26 can come within 1/16 inch or closer to bending axis 46, the flexible molding can bent into a tighter curve than is possible with commercially available flexible molding. Flexible molding 10 and 10' also have much less tendency to lay out (i.e., the angle between support flange 14 and web 12 remains the same) so that ceiling panels 16 or pans lay flat on the flange. Very importantly, that part of support flange 14 under base 30 tends to bend along with and at the same angle as tabs 28 such that V-shaped notches 26 do not form a relief in tape 34 unlike squared notched commercially available flexible molding.

When installed, molding 10 or 10' presents an improved, smooth, unbroken and good-looking surface on the lower side of support flange 14. The improved quality of flexible molding 10 or 10' may be utilized to meet the higher standards demanded by some building owners and their architects.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A flexible edge molding comprising a metal strip with a longitudinal axis and a pair of side edges parallel thereto, a row of narrow spaced apart substantially V-shaped notches along one of the side edges, each of said V-shaped notches having a base and a pair of side walls, said side walls converging towards a point proximal the base, a thin stretchable plastic tape with a longitudinal axis stretched and then attached along the notched side edge of the metal strip, said strip bent at a first angle along a line passing below the base and proximal the point of the V-shaped notches, said bent strip forming a web having an upper and a lower margin for attachment along a curved wall and a support flange attached to the lower margin of the web extending outwardly from the curved wall for use in supporting acoustical ceiling panels or metal pans whereby the first angle is substantially the same angle along the length of the flange.

2. The edge molding of claim 1 wherein the first angle is such that the support flange and the web are at substantially right angles.

3. The edge molding of claim 2 wherein the stretchable tape is folded around the notched side edge and adhered to the inside of the support flange and the back of the web.

4. The edge molding of claim 1 wherein a second row of narrow spaced apart substantially V-shaped notches is formed along the second side edge of the metal strip, each of said V-shaped notches having a base and a pair of side walls, said side walls converging towards a point proximal the base, said strip bent at a second angle along a line passing below the base and proximal the point of the second row of V-shaped notches, said second angle being of opposite hand to the first angle and forming a second flange at the upper margin of the web overlying the first flange.

5. The edge molding of claim 4 wherein the first and second angle are such that the first and second support flanges and the web are at substantially right angles.

* * * * *